(12) United States Patent
Jeon (10) Patent No.: US 10,054,209 B2
(45) Date of Patent: Aug. 21, 2018

(54) TORQUE TRANSMITTING DEVICE

(71) Applicant: VALEO EMBRAYAGES, Amiens (FR)

(72) Inventor: Gyubong Jeon, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/187,017

(22) Filed: Jun. 20, 2016

(65) Prior Publication Data

US 2017/0363193 A1 Dec. 21, 2017

(51) Int. Cl.
*F16F 15/121* (2006.01)
*F16H 45/02* (2006.01)

(52) U.S. Cl.
CPC .......... *F16H 45/02* (2013.01); *F16F 15/1213* (2013.01); *F16H 2045/0205* (2013.01); *F16H 2045/0221* (2013.01); *F16H 2045/0236* (2013.01)

(58) Field of Classification Search
CPC .................................................. F16F 15/1213
See application file for complete search history.

(56) References Cited

U.S. PATENT DOCUMENTS

| | | | |
|---|---|---|---|
| 2,551,718 A | 5/1951 | Auten | |
| 4,145,936 A * | 3/1979 | Vincent | B64C 27/001 416/500 |
| 4,795,012 A * | 1/1989 | Durum | F16D 3/52 192/207 |
| 5,697,261 A | 12/1997 | Mokdad et al. | |
| 5,893,355 A | 4/1999 | Glover et al. | |
| 9,234,554 B2 * | 1/2016 | Dadd | F16F 1/027 |
| 2002/0117373 A1 | 8/2002 | Kraus et al. | |
| 2003/0106763 A1 | 6/2003 | Kimura et al. | |
| 2015/0369296 A1 | 12/2015 | Lopez-Perez | |
| 2017/0234399 A1 * | 8/2017 | Durham | F16H 45/02 |
| 2017/0234400 A1 | 8/2017 | Fenioux et al. | |

FOREIGN PATENT DOCUMENTS

| | | |
|---|---|---|
| DE | 19729421 A1 | 1/1998 |
| DE | 19919449 A1 | 11/1999 |
| DE | 102004024747 A1 | 12/2005 |
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |

(Continued)

*Primary Examiner* — Robert W Hodge
*Assistant Examiner* — Ryan P Dodd
(74) *Attorney, Agent, or Firm* — Berenato & White, LLC (57) ABSTRACT

The invention relates to a torque transmitting device comprising a torque input element (17a, 17b) and a torque output element (8) able to pivot about a shaft (X) with respect to one another, at least one elastic leaf (22), rotationally coupled to the torque output element (8) or to the torque input element (17a, 17b) respectively, the elastic leaf (22) being able to be elastically and radially supported by a supporting member (18) carried by the torque input element (17a, 17b) or the torque output element (8) respectively, the elastic leaf (22) being able to bend upon rotation of the torque input element (17a, 17b) with respect to the torque output element (8).

18 Claims, 4 Drawing Sheets

(56) References Cited

FOREIGN PATENT DOCUMENTS

| | | |
|---|---|---|
| FR | 2828543 A1 | 2/2003 |
| FR | 2938030 A1 | 5/2010 |
| FR | 3000155 A1 | 6/2014 |
| FR | 3008152 | 1/2015 |
| FR | 3027986 A1 | 5/2016 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |
| WO | WO2016020584 A1 | 2/2016 |
| WO | WO2016050612 A1 | 4/2016 |

\* cited by examiner

Fig. 1

(Prior Art)

TORQUE TRANSMITTING DEVICE

FIELD OF THE INVENTION

The present invention relates to a torque transmitting device and a hydrokinetic torque coupling device for a motor vehicle, such as a torque converter, for instance.

BACKGROUND OF THE INVENTION

Figure 1:
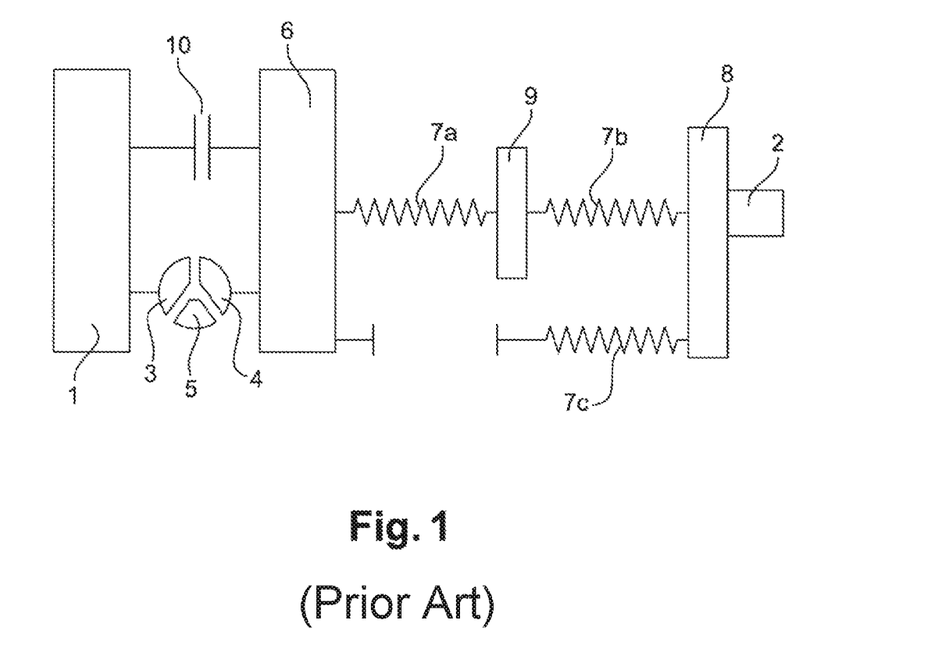
FIG. 1 is a schematic representation of a torque converter of the prior art.

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant α angular offset of the guiding washers 6 relative to the hub 8 (or vice versa).

It can be understood, in a damping device as shown in FIG. 1, that the representation of a function M=f(α) which defines the torque M transmitted though the device according to the α angular shift of the respective elastic members 7a, 7b, and 7c, can be shown via a first linear portion of a slope Ka (for the low values of the α angular shift) and a second, more important, linear portion of a slope Kb (for the high value of the α angular shift). Ka and Kb are the angular stiffness of the damping device, at the beginning and at the end of the angular travel respectively. If K1 defines the cumulative stiffness of the first springs of each pair of the first group 7a, and K2 defines the cumulative stiffness of the second springs 7b of each pair of the first group, and K3 defines the cumulative stiffness of the springs of the second group 7c, then Ka=(K1·K2)/(K1+K2) and Kb=Ka+K3.

The break of slope between the first and second portions of the curve may generate vibrations and a significant hysteresis upon operation of the torque converter which might affect the quality of filtration obtained using the damping means.

In order to remedy this drawback, the patent FR 3 008 152, in the name of the Applicant, provides a torque transmitting device comprising a torque input element and a torque output element able to pivot about an axis with respect to one another, two elastic leaves rotationally coupled to the torque output element or to the torque input element respectively, said elastic leaves being elastically and radially held to rest on supporting members carried by the torque input element or the torque output element respectively, with said elastic leaves being able to bend upon rotation of the torque input element with respect to the torque output element.

Such transmitting device provides damping means, consisting of the elastic leaves, which have a characteristic gradual curve, without any break of slope. Such a device thus makes it possible to reduce the vibrations generated in operation and provides a high quality of filtration.

However, the manufacturing of such leaves is difficult to implement. As a matter of fact, such leaves are relatively heavy and producing same, for instance by cutting, and obtaining a correct surface condition of the leaves in contact with the supporting members is difficult.

SUMMARY OF THE INVENTION

The invention more particularly aims at providing a simple, efficient and cost-effective solution to this problem.

For this purpose, it provides for a torque transmitting device comprising a torque input element and a torque output element able to pivot about a shaft with respect to one another, at least one elastic leaf rotationally coupled to the torque output element or to the torque input element respectively, said elastic leaf being able to be elastically and radially held to rest on a supporting member carried by the torque input element or the torque output element respectively, said elastic leaf being able to bend upon rotation of the torque input element with respect to the torque output element, characterized in that the elastic leaf comprises at least two stacked elastic leaves, with said leaves comprising one area for the connection with the torque output element, respectively to the torque input element, and one area for bearing the supporting member, with said leaves being linked together through at least one linking member integral with a first leaf and engaged with a radial clearance in at least one second leaf.

Producing the elastic leaf from a stack of several blades facilitates the production of said leaf. As a matter of fact, the blades can easily be made by a fine cutting of sheets, while obtaining a correct surface condition of the surfaces in contact with the supporting member.

The radial clearance makes it possible to compensate for a possible misalignment of the surfaces in contact with the supporting member between the different blades, with such misalignment resulting from the dimensional tolerances in production.

This ensures that the supporting member is able to simultaneously rest on all the blades of the same elastic leaf.

It should be noted that the words «radial» and «axial» are defined with respect to the axis of the transmitting device, which is specifically the axis of rotation of the torque input element with respect to the torque output element.

The blades can be linked together, in said resting area, through the linking member.

The linking area and the resting area may be radially shifted with respect to one another and connected by a curved area.

The linking member may be so designed as to maintain the axial position of the blades with respect to one another.

The linking member is a rivet for instance.

The blades can thus be connected together in said resting area through at least two linking members, with each linking member being integral with one blade and engaged, with a radial clearance, into at least another blade.

The supporting member may comprise a rolling body so mounted as to pivot about a shaft, with such shaft being attached to the torque input element, respectively to the torque output element.

In such case, the rolling body of the supporting member consists of a roller so mounted as to pivot about a shaft, through a rolling bearing, such as a needle bearing, for instance.

The elastic leaf may be so designed that, in a relative angular position between the torque input element and the torque output element different from a rest position, the supporting member exerts a bending stress on the elastic leaf causing a cross reaction force of the elastic leaf on the supporting member, with such reaction force having a circumferential component which tends to move back the torque input element and the torque output element toward said relative rest position.

The elastic leaf is so designed that, in a relative angular position between the torque input element and the torque output element different from a rest position, the supporting member exerts a bending stress on the elastic leaf causing a cross reaction force of the elastic leaf on the supporting member, with such reaction force having a radial component which tends to maintain the elastic leaf in contact with the supporting member.

The angular displacement of the torque input element relative to the torque output element is greater than 20° and preferably greater than 40°.

The damping means may comprise at least two elastic leaves, with each elastic leaf rotating together with the torque output element, or the torque input element respectively, with each leaf being associated with a supporting element rotationally linked with the torque input element or the torque output element respectively, with each leaf being elastically maintained supported by said matching supporting element, with each elastic leaf being adapted to bend upon rotation of the torque input element relative to the torque output element.

The blades linking areas may be annular and comprise radially internal ribs, able to cooperate with ribs on the torque output element, respectively the torque input element.

The invention also relates to a hydrokinetic torque coupling device for a motor vehicle, comprising
- an impeller wheel intended to be rotationally coupled to a crankshaft,
- a turbine wheel able to be hydrokinetically rotated by the impeller wheel, and able to be rotationally coupled to a transmission input shaft,
- clutch means,
- a torque transmitting device of the type mentioned above, with the torque input element being linked to or consisting of the clutch means, with the torque output element being linked to or consisting of a hub intended to be rotationally coupled to the transmission input shaft,
- the clutch means being movable between an engaged position in which the impeller wheel and the torque input element of the torque transmitting device are rotationally coupled and a disengaged position in which the impeller wheel and said torque input element are rotationally uncoupled.

Besides, such a hydrokinetic torque coupling device is easy to mount and rather inexpensive.

The hub may be rotationally coupled to the turbine wheel.

The clutch means may comprise a piston.

The supporting member may be cylindrical and extend parallel to the axis of the torque transmitting device.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

The impeller wheel may be rotationally coupled to the torque input element and able to hydrokinetically drive a turbine wheel, through a reactor.

The hydrokinetic torque coupling device may also comprise one or more of the following characteristics:
- the supporting member is mounted on the radially external periphery of at least one flange belonging to the torque input element,
- said flange is rotationally coupled to the piston, for instance at the radially external periphery of the flange,
- the flange is so mounted as to pivot about the torque output element,
- the supporting member is axially mounted between two flanges which radially extend and are axially shifted with respect to one another,
- the impeller wheel is rotationally coupled to a cover wherein the impeller wheel, the turbine wheel and/or the torque transmitting device are at least partially accommodated.
- the torque output element comprises a hub intended to be rotationally coupled to a transmission input shaft.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFFERRED EMOBODIMENT(S)

A hydrokinetic torque coupling device according to a first embodiment of the invention is shown in FIGS. 2 to 7. The hydrokinetic torque coupling device is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

Figure 2:
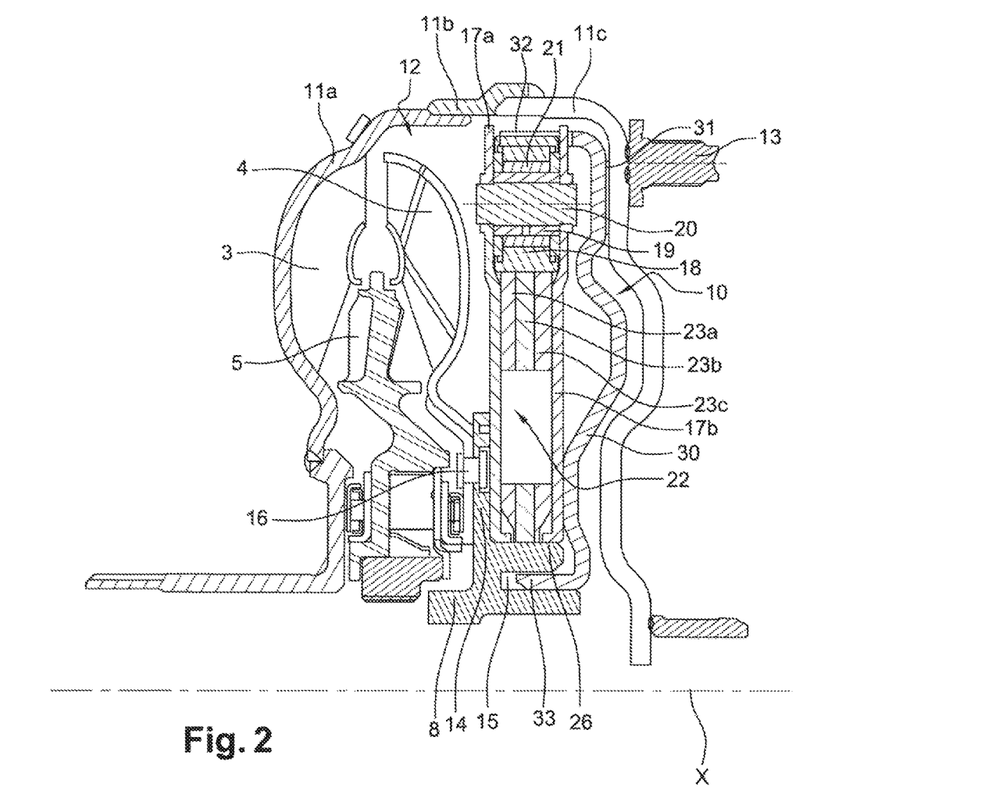
FIG. 2 is a half-section along an axial plane, of a torque converter according to the invention.
Figure 3:
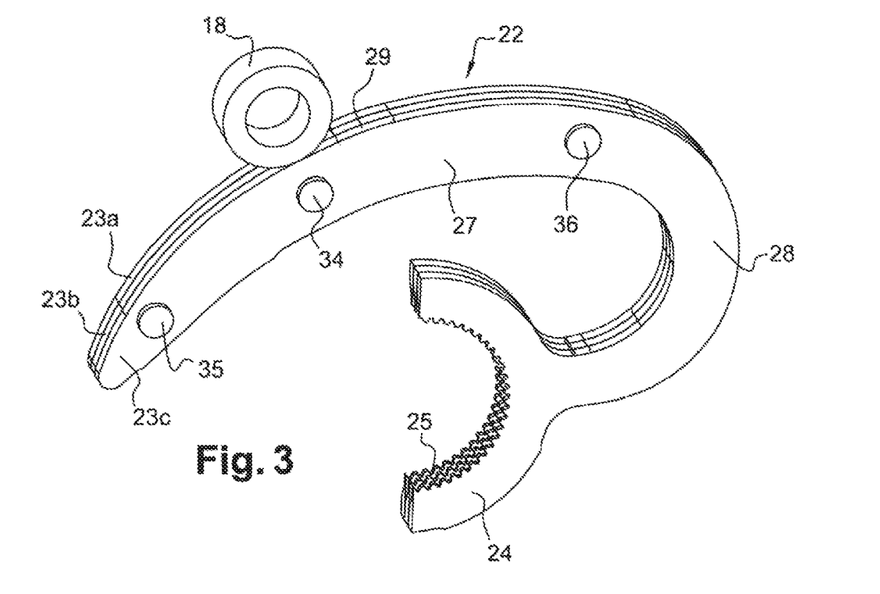
FIG. 3 is a perspective view of a part of an elastic leaf and a supporting member, according to one embodiment of the invention.

The torque converter conventionally comprises an impeller bladed wheel 3, able to hydrokinetically drive a turbine bladed wheel 4 through a reactor 5.

The impeller wheel 3 is fastened to a cover consisting of several parts 11a, 11b, 11c assembled together by welding and defining an internal volume 12 accommodating the impeller wheel 3, the turbine wheel 4 and the reactor 5. Said cover 11a, 11b, 11c, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises an annular rim 14 which radially extends outwards and an annular groove 15 which axially opens opposite the impeller wheel 3 and the turbine wheel 4.

The turbine wheel 4 is fastened to the first annular rim 14 of the central hub 8, for instance by rivets 16 or by welding.

The torque converter further comprises two radial flanges 17a, 17b, axially shifted with respect to one another. The flanges 17a, 17b are so mounted as to pivot about the hub 8.

Two supporting members or rolling bodies 18 shaped as rollers or cylindrical rollers, are fastened on the radially external periphery of the flanges 17a, 17b, axially between the flanges 17a, 17b. The rolling bodies 18 are positioned so as to be diametrically opposed. More specifically, the rolling bodies 18 are mounted about axes 19 which axially extend between the flanges 17a, 17b and rotationally coupling said flanges 17a, 17b. The axes 19 are mounted on the flanges 17a, 17b through rivets 20, screws, or bolts, for instance. The rolling bodies 18 are mounted on the shafts 19 through rolling bearings, such as needle bearings 21, for instance.

The torque converter further comprises two opposed elastic leaves 22, consisting of three stacked blades 23a, 23b, 23c. As can be best seen in FIGS. 3 to 7, each blade 23a, 23b, 23c is symmetrical with respect to the X axis, with only one half of the blades being shown in the FIGS. 3 and 4.

Figure 4:
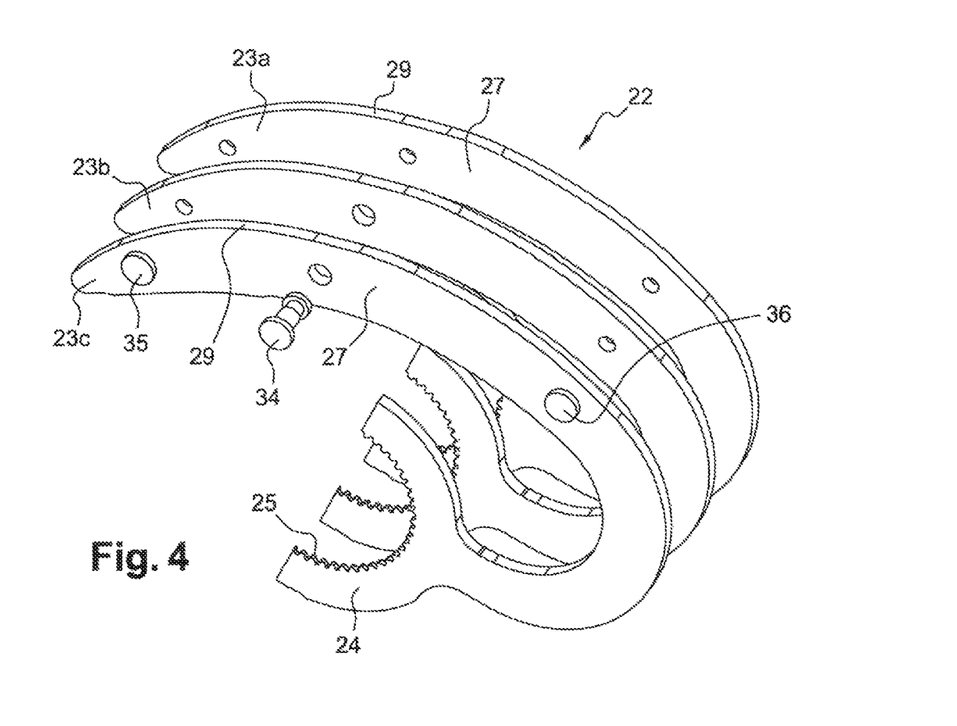
FIG. 4 is a perspective exploded view of the elements illustrated in FIG. 3.

Each blade 23a, 23b, 23c comprises a radially internal annular linking area 24, which comprises radially internal ribs or teeth 25 and cooperating with radially external ribs 26 (shown in FIG. 2) of the hub 8 so as to rotationally couple said hub 8 and said blades 23a, 23b, 23c. Each blade further comprises two radially external and diametrically opposed strands 27 (only one strand 27 is shown in FIG. 4), forming the leaves 22, each one being linked to the linking area 24 by a curved or bent area 28. Each external strand 27 and each curved area 28 are elastically deformable. The curved area of each strand 28 covers an angle of approximately 180°, or on-half the circumference of two strand elements when assembled.

The radially external strand 27 comprises a radially external surface 29 which forms a raceway supported by the corresponding rolling body 18, with said rolling body 18 being positioned radially outside the external strands 29 of the elastic blades 23a, 23b, 23c. Each raceway 29 has a globally convex shape. The raceway 29 may directly consist of a zone of the external strand 27 or of a part which is added onto said external strand 27.

The blades 23a, 23b, 23c are linked together by rivets 34, 35, 36 mounted on the external strands 27 of said blades, in particular by three rivets 34, 35, 36 shifted with respect to one another on the circumference. A first rivet 34 is positioned opposite the rolling body 18 in a rest position of the torque converter, i.e. in a position in which no torque is transmitted through said torque converter, with the second and third rivets 35, 36 being positioned on either side of the first rivet 34, respectively close to the free end of the external strand 27 and close to the curved area 28.

Figure 5:
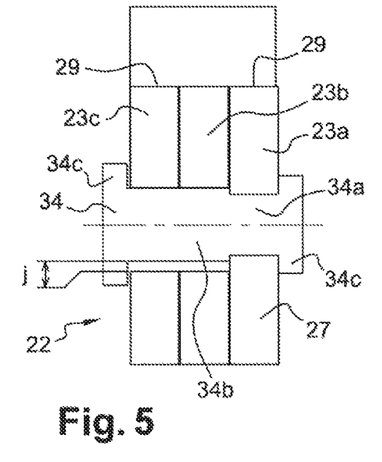
FIG. 5 is a detailed sectional view along an axial plane, which illustrates the link between the various blades of the same elastic leaf, as well as the matching supporting member, when the supporting member presses all the blades.
Figure 6:
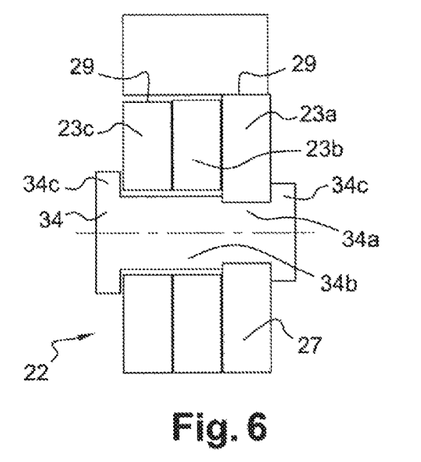
FIG. 6 is a view similar to FIG. 5, which illustrates a rest condition of all the blades or the case when these are not pressed by the supporting member.
Figure 7:
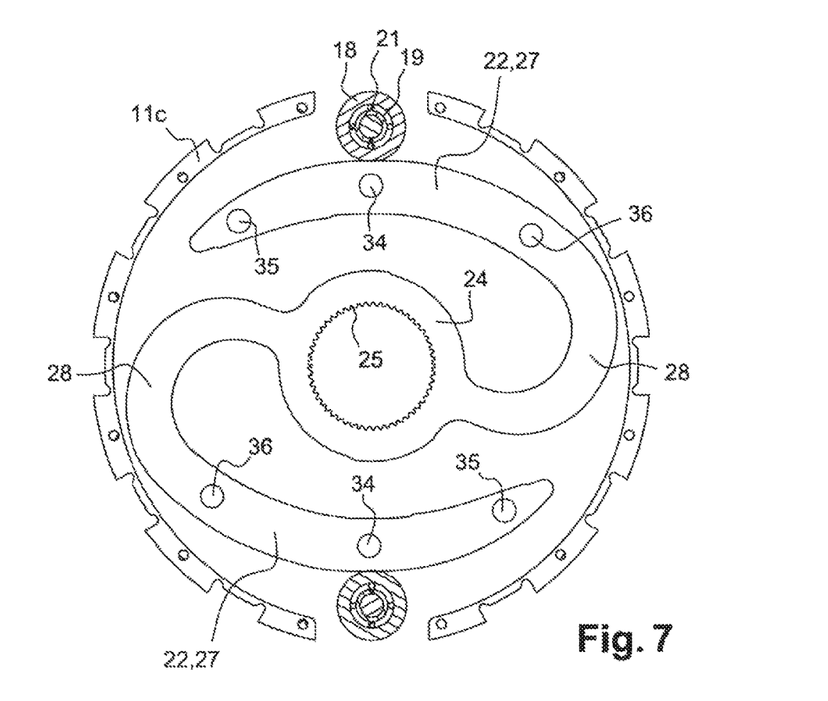
FIG. 7 is a front view of the blades and the supporting member, in a rest position.

As is best seen in FIGS. 5 et 6, each rivet 34, 35, 36 comprises a part, noted 34a for the rivet 34, attached to one of the blades, here the blade 23a, with the rest 34b of the rivet 34 being engaged, with a radial clearance j, for instance, in the other blades 23b, 23c. The ends of the rivets comprise heads 34c resting on the external side surfaces of the blades 23a and 23c, so as to axially maintain the blades 23a, 23b, 23c together.

The dimensional tolerances, in production, between the blades 23a, 23b, 23c may cause a radial shifting of the raceways 29 of the various blades 23a, 23b, 23c, as can be seen in the rest position illustrated in FIG. 6, where the blades 23b and 23c do not rest on the matching rolling body 18.

In operation, when the rolling body 18 moves along the raceways 29, it presses the three blades 23a, 23b, 23c simultaneously, as illustrated in FIG. 5, with the radial clearances j between the rivets 34, 35, 36 and the blades 23a, 23b, 23c making it possible to absorb or to compensate the dimensional discrepancies between the blades 23a, 23b, 23c and thus enable a simultaneous contact of the rolling body 18 on the three blades 23a, 23b, 23c.

Between each elastic leaf 23a, 23b, 23c and the matching rolling body 18, the transmitted torque is broken down into radial stresses and peripheral stresses. Radial stresses make it possible for the matching leaf 23a, 23b, 23c to bend and peripheral stresses make it possible for the matching rolling body 18 to move on the raceway 29 of the blade 23a, 23b, 23c and to transmit the torque.

The torque converter further comprises clutch means 10 adapted to rotationally couple the cover 11 and the external flanges 17a, 17b, in the engaged position, and adapted to release the cover 11 and the flanges 17a, 17b, in a disengaged position.

The clutch means 10 comprise an annular piston 30 which extends radially and is accommodated in the inner space 12 of the cover 10, the radially external periphery of which comprises a resting area equipped with clutch lining 31 and adapted to rest on the part 11c of the cover 11 in an engaged position, so as to provide a rotational coupling of the cover 11 and the piston 30.

The radially external periphery of the piston 30 further comprises at least one axially extending coupling lug 32 engaged into a notch or a recess having a shape matching that of the flanges 17a, 17b, so as to rotationally couple the piston 30 and the flanges 17a, 17b while allowing an axial motion of the piston 30 with respect to the flanges 17a, 17b.

The radially internal periphery of the piston 30 comprises a cylindrical rim 33 accommodated in the annular groove 15 of the hub and rotationally guided about the radially internal cylindrical surface of said groove 15.

The axial motion of the piston 30 is controlled by pressure chambers positioned on either side of the piston 30.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 30, the torque goes through the hydrokinetic coupling means, i.e. the impeller wheel 3 and then the turbine wheel 4 fixed to the hub 8. The torque is then transmitted to the transmission input shaft 2 coupled to the hub through the internal ribs of the hub 8.

In the engaged position of the piston 30, the torque from the cover 11 is transmitted to the flanges 17a, 17b through the damping means formed by the elastic leaves 22 and by the supporting members 18. The torque is then transmitted to the internal hub 8 coupled to the blades 23a, 23b, 23c, then to the transmission input shaft 2 coupled to the hub 8 through the internal ribs of said hub 8.

In the engaged position of the piston 30, when the torque transmitted between the cover 11 and the hub 8 varies, the radial stresses exerted between each elastic leaf 22 and the matching rolling body 18 vary and the bending of the elastic leaf 22 is modified. The modification in the bending of the leaf 22 comes with a motion of the rolling body 18 along the matching raceways 29 due to peripheral stresses.

The raceways 29 have profiles so arranged that, when the transmitted torque increases, the rolling bodies 18 each exert a bending stress on the matching elastic blades 23a, 23b, 23c which causes the free distal end of the elastic blades 23a, 23b, 23c to move towards the X axis and a relative rotation between the cover 11 and the hub 8 such that the later move away from their relative rest positions. Rest position means the relative position of the flange 11 relative to the hub 8, wherein no torque is transmitted between the latter.

The profiles of the raceways 29 are thus such that the rolling bodies 18 exert bending stresses having radial components and circumferential components onto the elastic leaves 22.

The elastic leaves 22 exert, onto the rolling bodies 18, a backmoving force having a circumferential component which tends to rotate the rolling bodies 21 in a reverse direction of rotation and thus to move back the turbine wheel 4 and the hub 8 towards their relative rest positions, and a radial component directed outwards which tends to maintain the raceways 29 supported by the matching rolling body 18.

When the cover 11 and the hub 8 are in their rest positions, the elastic leaf 22 is preferably radially pre-stressed toward the X axis so as to exert a reaction force directed radially outwards, so as to maintain at least one of the blades 23a, 23b, 23c supported by the matching rolling body 18, here the blade 23a.

The profiles of the raceways 29 may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 22 are regularly distributed around the X axis and are symmetrical relative to the X axis so as to ensure the balance of the torque converter.

The torque converter may also comprise friction means so arranged as to exert a resisting torque between the cover 11 and the hub 8 during the relative displacement thereof so as to dissipate the energy stored in the elastic leaves 22.

Of course, the number of leaves in each elastic leaf 22 may vary. Each leaf 22 can thus consist of two blades for instance.

The invention claimed is:

1. A torque transmitting device comprising a torque input element (17a, 17b) and a torque output element (8) able to pivot about an axis (X) with respect to one another, at least one elastic leaf (22), rotationally coupled between the torque output element (8) and the torque input element (17a, 17b) respectively, said elastic leaf (22) being elastically and radially supported by a supporting member (18) carried by the torque input element (17a, 17b), said elastic leaf (22) being able to bend upon rotation of the torque input element (17a, 17b) with respect to the torque output element (8), wherein the elastic leaf (22) comprises at least two stacked elastic blades (23a, 23b, 23c), said blades comprising one linking area (24) for the connection with the torque output element (8), and a second area (27) for bearing the supporting member (18), said blades (23a, 23b, 23c) being linked together through at least one linking member (34, 35, 36) integral with a first blade (23a) and engaged with a radial clearance (j) in at least one second blade (23b, 23c).

2. A torque transmitting device according to claim 1, wherein the blades (23a, 23b, 23c) are linked together, in said second area (27), through the linking member (34, 35, 36).

3. A torque transmitting device according to claim 1, wherein the linking area (24) and the second area (27) are radially shifted with respect to one another and linked by a curved area (28).

4. A torque transmitting device according to claim 1, wherein the linking member (34, 35, 36) is configured to hold the axial position of the blades (23a, 23b, 23c) with respect to one another.

5. A torque transmitting device according to claim 1, wherein the linking member is a rivet (34, 35, 36).

6. A device according to claim 1, wherein the blades (23a, 23b, 23c) are linked together in said second area (27) through at least two linking members (34, 35, 36), each linking member (34, 35, 36) being integral with one blade (23a) and engaged with a radial clearance (j) in at least another blade (23b, 23c).

7. A device according to claim 1, wherein the supporting member comprises a rolling body (18) so mounted as to pivot about a shaft (19), with said shaft (19) being fastened to the torque input element.

8. A device according to claim 7, wherein the rolling body of the supporting member consists of a roller (18) so mounted as to pivot about a shaft (19), through a rolling bearing (21).

9. A device according to claim 1, wherein the elastic leaf (22) is so designed that, in a relative angular position between the torque input element (17a, 17b) and the torque output element (8) different from a rest position, the supporting member (18) exerts a bending stress on the elastic leaf (22) causing a cross reaction force of the elastic leaf (22) on the supporting member (18), with such reaction force having a circumferential component which tends to move back the torque input element (17a, 17b) and the torque output element (8) toward said relative rest position.

10. A device according to claim 1, wherein the elastic leaf (22) is so designed that, in a relative angular position between the torque input element (17a, 17b) and the torque output element (8) different from a rest position, the supporting member (18) exerts a bending stress on the elastic leaf (22) causing a cross reaction force of the elastic leaf (88)

on the supporting member (18), with such reaction force having a radial component which tends to maintain the elastic leaf (22) in contact with the supporting member (18).

11. A device according to claim 1, wherein the angular displacement of the torque input element supporting member (17*a*, 17*b*) relative to the torque output element (8) is greater than 20°.

12. A device according to claim 1, wherein the damping means comprise at least two elastic leaves (22), with each elastic leaf (22) rotating together with the torque output element (3), with each leaf (22) being associated with said supporting element (18) rotationally linked with the torque input element (17*a*, 17*b*), with each leaf (22) being elastically maintained supported by said matching supporting element (18), with each elastic leaf (22) being adapted to bend upon rotation of the torque input element (17*a*, 17*b*) relative to the torque output element (8).

13. A hydrokinetic torque coupling device for a motor vehicle, comprising an impeller wheel (3) intended to be coupled to a crankshaft (1), a turbine wheel (4) able to be hydrokinetically rotated by the impeller wheel (3), and able to be rotationally coupled to a transmission input shaft (2), clutch means (10), a torque transmitting device according to claim 1, with the torque input element (17*a*, 17*b*) being linked to or consisting of the clutch means (10), with the torque output element being linked to or consisting of a hub (8) intended to be rotationally coupled to the transmission input shaft (2), the clutch means (10) being movable between an engaged position in which the impeller wheel (3) and the torque input element (17*a*, 17*b*) of the torque transmitting device are rotationally coupled and a disengaged position in which the impeller wheel (3) and said torque input element (17*a*, 17*b*) are rotationally uncoupled.

14. A hydrokinetic torque coupling device according to claim 13, wherein the hub (8) is rotationally coupled to the turbine wheel (4).

15. A hydrokinetic torque coupling device according to claim 13, wherein the clutch means (10) comprise a piston (30).

16. A device according to claim 2, wherein the linking area (24) and the second area (27) are radially shifted with respect to one another and linked by a curved area (28).

17. A device according to claim 2, wherein the linking member (34, 35, 36) is so designed as to hold the axial position of the blades (23*a*, 23*b*, 23*c*) with respect to one another.

18. A device according to claim 3, wherein the linking member (34, 35, 36) is so designed as to hold the axial position of the blades (23*a*, 23*b*, 23*c*) with respect to one another.

\* \* \* \* \*